US011172330B2

(12) United States Patent
Lerner et al.

(10) Patent No.: US 11,172,330 B2
(45) Date of Patent: Nov. 9, 2021

(54) PRESENCE DETECTION BASED ON CROWD SURFING SIGNAL STRENGTH

(71) Applicant: GROUPON, INC., Chicago, IL (US)

(72) Inventors: Yishai Lerner, San Francisco, CA (US); Ulf Schwekendiek, San Francisco, CA (US); Tuomas Artman, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 79 days.

(21) Appl. No.: 16/813,954

(22) Filed: Mar. 10, 2020

(65) Prior Publication Data

US 2020/0280818 A1  Sep. 3, 2020

Related U.S. Application Data

(63) Continuation of application No. 16/225,165, filed on Dec. 19, 2018, now Pat. No. 10,631,124, which is a continuation of application No. 15/598,774, filed on May 18, 2017, now Pat. No. 10,200,817, which is a continuation of application No. 14/846,288, filed on Sep. 4, 2015, now Pat. No. 9,693,193, which is a continuation of application No. 14/638,703, filed on Mar. 4, 2015, now Pat. No. 9,154,916, which is a continuation of application No. 13/841,247, filed on Mar. 15, 2013, now Pat. No. 9,002,375.

(51) Int. Cl.
*H04W 4/02* (2018.01)
*H04W 4/80* (2018.01)
*H04W 4/029* (2018.01)
*G06Q 30/02* (2012.01)

(52) U.S. Cl.
CPC ........ *H04W 4/023* (2013.01); *G06Q 30/0281* (2013.01); *H04W 4/029* (2018.02); *H04W 4/80* (2018.02)

(58) Field of Classification Search
CPC ....... H04W 4/023; H04W 4/029; H04W 4/80; H04W 4/008; H04W 4/02; G06Q 30/0281
See application file for complete search history.

(56) References Cited

U.S. PATENT DOCUMENTS

| 9,002,375 | B1 | 4/2015 | Lerner et al. |
| 2004/0203895 | A1 | 10/2004 | Senaka |
| 2005/0208952 | A1 | 9/2005 | Dietrich et al. |
| 2008/0084858 | A1* | 4/2008 | Hart .................. H04W 64/00 370/342 |

(Continued)

*Primary Examiner* — Kibrom T Hailu
(74) *Attorney, Agent, or Firm* — Alston & Bird LLP

(57) ABSTRACT

A method includes receiving wireless signals from consumer devices that are in communicable range of the merchant device. The wireless signals each include a unique identifier associated with one of the consumer devices. The method further comprises generating signal strength data that includes one signal strength value associated with the unique identifier of each of the wireless signals, storing the signal strength data in a data storage device, analyzing the signal strength data to determine how many of the consumer devices achieved various signal strength levels, determining a threshold signal strength value based on the analysis, determining a consumer device is present within a physical area when a subsequent wireless signal from a subsequent consumer device is greater than the threshold signal strength value.

20 Claims, 9 Drawing Sheets

(56) References Cited

U.S. PATENT DOCUMENTS

| | | |
|---|---|---|
| 2013/0151258 A1 | 6/2013 | Chandrasekar et al. |
| 2013/0162481 A1 | 6/2013 | Parvizi et al. |
| 2013/0336138 A1 | 12/2013 | Venkatraman et al. |
| 2014/0045520 A1 | 2/2014 | Lim et al. |
| 2014/0355592 A1 | 12/2014 | Camps et al. |

* cited by examiner

| Signal Strength (dB) | Number of devices/sessions |
|---|---|
| 0-0.5 | 700 |
| 0.5-1.0 | 500 |
| 1.0-1.5 | 70 |
| 1.5-2.0 | 55 |
| 2.0-2.5 | 40 |
| 2.5-3.0 | 25 |
| >3.0 | 20 |

340

| Signal Strength (dB) | Time (s) |
|---|---|
| 0-0.5 | 10 |
| 0.5-1.0 | 30 |
| 1.0-1.5 | 250 |
| 1.5-2.0 | 255 |
| 2.0-2.5 | 260 |
| 2.5-3.0 | 300 |
| >3.0 | 350 |

Fig. 3C

PRESENCE DETECTION BASED ON CROWD SURFING SIGNAL STRENGTH

CROSS-REFERENCE TO RELATED APPLICATIONS

This application is a continuation of U.S. application Ser. No. 16/225,165, filed Dec. 19, 2018, which is a continuation of U.S. patent application Ser. No. 15/598,774, filed May 18, 2017 (now U.S. Pat. No. 10,200,817), which is a continuation of U.S. application Ser. No. 14/846,288, filed Sep. 4, 2015 (now U.S. Pat. No. 9,693,193), which is a continuation of U.S. application Ser. No. 14/638,703, filed Mar. 4, 2015 (now U.S. Pat. No. 9,154,916), which is a continuation of U.S. application Ser. No. 13/841,247, filed Mar. 15, 2013 (now U.S. Pat. No. 9,002,375), each of which are hereby incorporated herein in their entirety by reference.

FIELD

Embodiments of the invention relate, generally, to facilitating interactions between consumer devices and merchant devices.

BACKGROUND

Electronically detecting the presence of a consumer allows merchants to provide enhanced services. For example, detecting that a consumer is within a store (e.g., as opposed to merely walking by), at a register or counter, in a certain section, or the like may be leveraged to provide a suitable service based on the location. In this regard, areas for improving current systems have been identified. Through applied effort, ingenuity, and innovation, solutions to improve such systems have been realized and are described in connection with embodiments of the present invention.

BRIEF SUMMARY

In general, embodiments provided herein may include systems, methods and computer readable media for determining the presence of a consumer within a physical area, such as within a merchant's shop. For example, provided herein is a method for determining the presence of a mobile device (e.g., a mobile device held by a consumer, or "consumer device") that may include:

According to one exemplary embodiment of the present invention, a method comprises receiving, by a merchant device, wireless signals from consumer devices that are in communicable range of the merchant device. The wireless signals each include a unique identifier associated with one of the consumer devices. The method further comprises generating signal strength data that includes at least one signal strength value associated with the unique identifier of each of the wireless signals, storing the signal strength data in a data storage device, accessing the signal strength data from the data storage device, analyzing the signal strength data to determine how many of the consumer devices achieved various signal strength levels, determining a threshold signal strength value based, at least in part, on the analyzing of how many of the consumer devices achieved the various signal strength levels, determining a consumer device is present within a physical area when a subsequent wireless signal from a subsequent consumer device is greater than the threshold signal strength value and determining the subsequent consumer device is outside the physical area when the subsequent wireless signal from the subsequent consumer device is less than the threshold signal strength value.

According to one exemplary embodiment of the present invention, a merchant device comprises a wireless receiver configured to receive wireless signals from consumer devices that are in communicable range of the merchant device, wherein the wireless signals each include a unique identifier associated with one of the consumer devices, generate signal strength data that includes at least one signal strength value associated with the unique identifier of each of the wireless signals, store the signal strength data in a data storage device, access the signal strength data from the data storage device, analyze the signal strength data to determine how many of the consumer devices achieved various signal strength levels, determine a threshold signal strength value based, at least in part, on the analyzing of how many of the consumer devices achieved the various signal strength levels, determine a consumer device is present within a physical area when a subsequent wireless signal from a subsequent consumer device is greater than the threshold signal strength value and determine the subsequent consumer device is outside the physical area when the subsequent wireless signal from the subsequent consumer device is less than the threshold signal strength value.

According to one exemplary embodiment of the present invention, a computer program product comprising a non-transitory computer readable storage medium and computer program instructions stored therein, the computer program instructions comprising program instructions configured to receive, by a merchant device, wireless signals from consumer devices that are in communicable range of the merchant device. The wireless signals each include a unique identifier associated with one of the consumer devices. The program instructions are further configured to generate signal strength data that includes at least one signal strength value associated with the unique identifier of each of the wireless signals, store the signal strength data in a data storage device, access the signal strength data from the data storage device, analyze the signal strength data to determine how many of the consumer devices achieved various signal strength levels, determine a threshold signal strength value based, at least in part, on the analyze of how many of the consumer devices achieved the various signal strength levels, determine a consumer device is present within a physical area when a subsequent wireless signal from a subsequent consumer device is greater than the threshold signal strength value and determine the subsequent consumer device is outside the physical area when the subsequent wireless signal from the subsequent consumer device is less than the threshold signal strength value.

Some embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media. These characteristics as well as additional features, functions, and details of the present invention are described below. Similarly, corresponding and additional embodiments are also described below.

BRIEF DESCRIPTION OF THE DRAWINGS

Figure 1A:
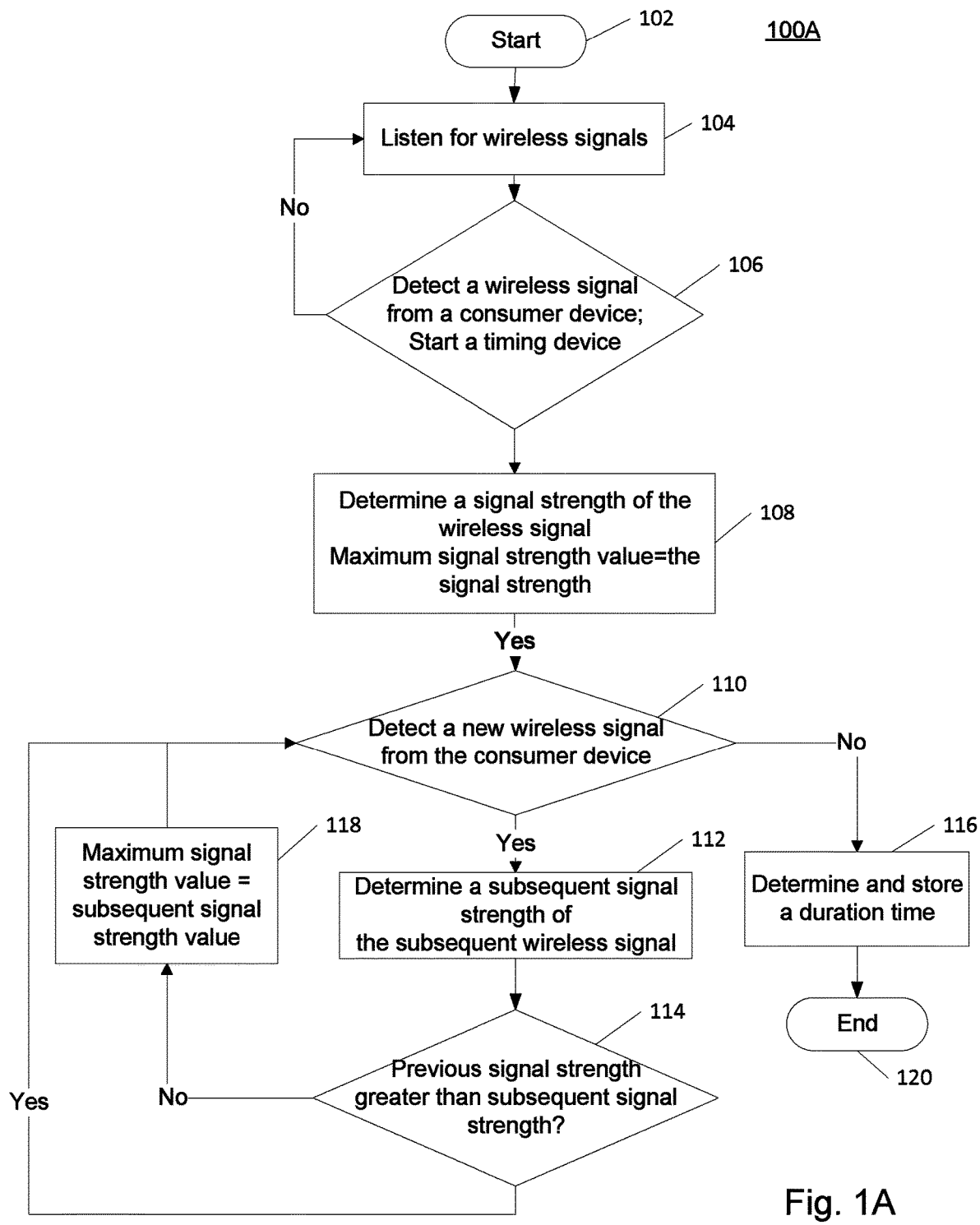
Figure 1B:
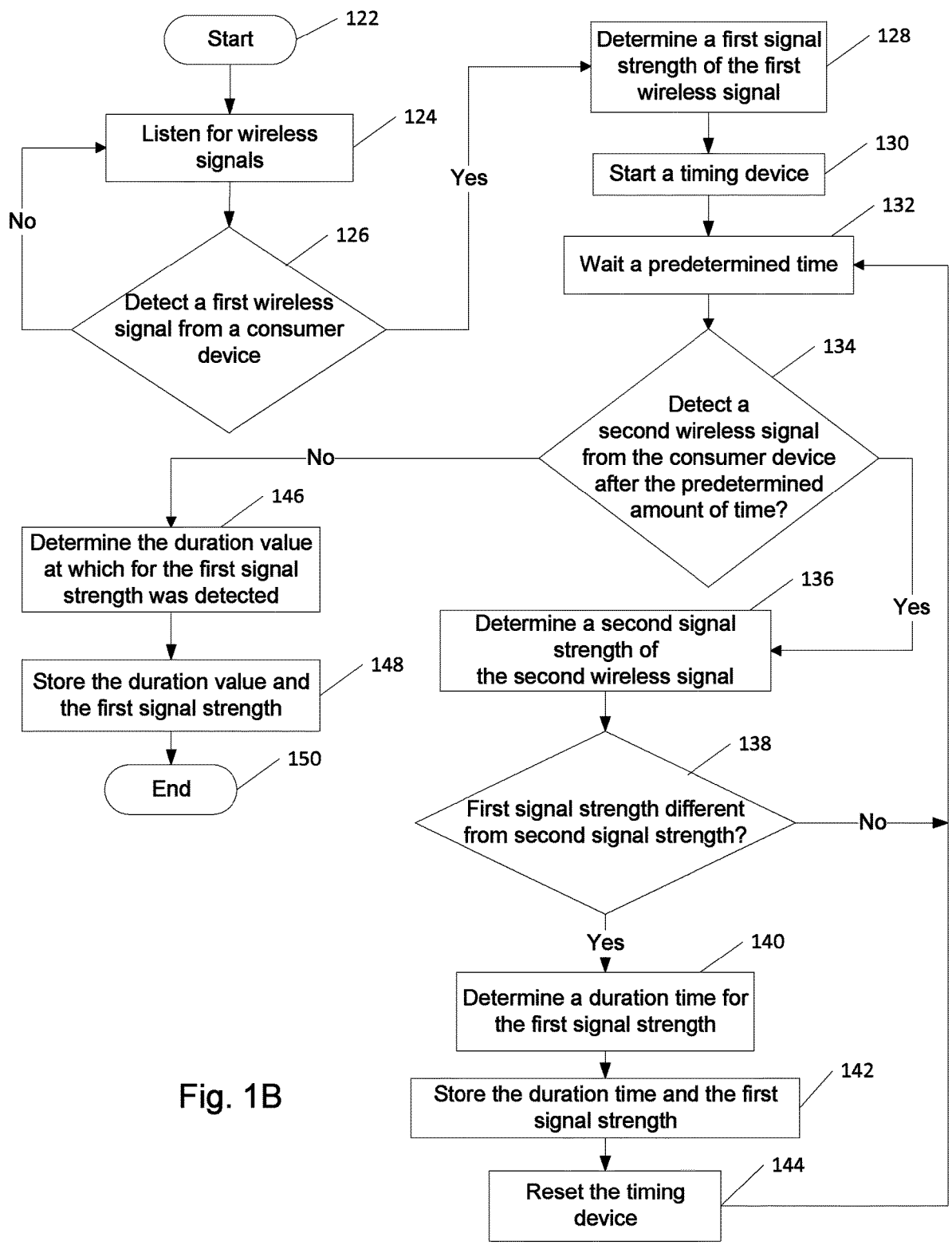
Figure 2:
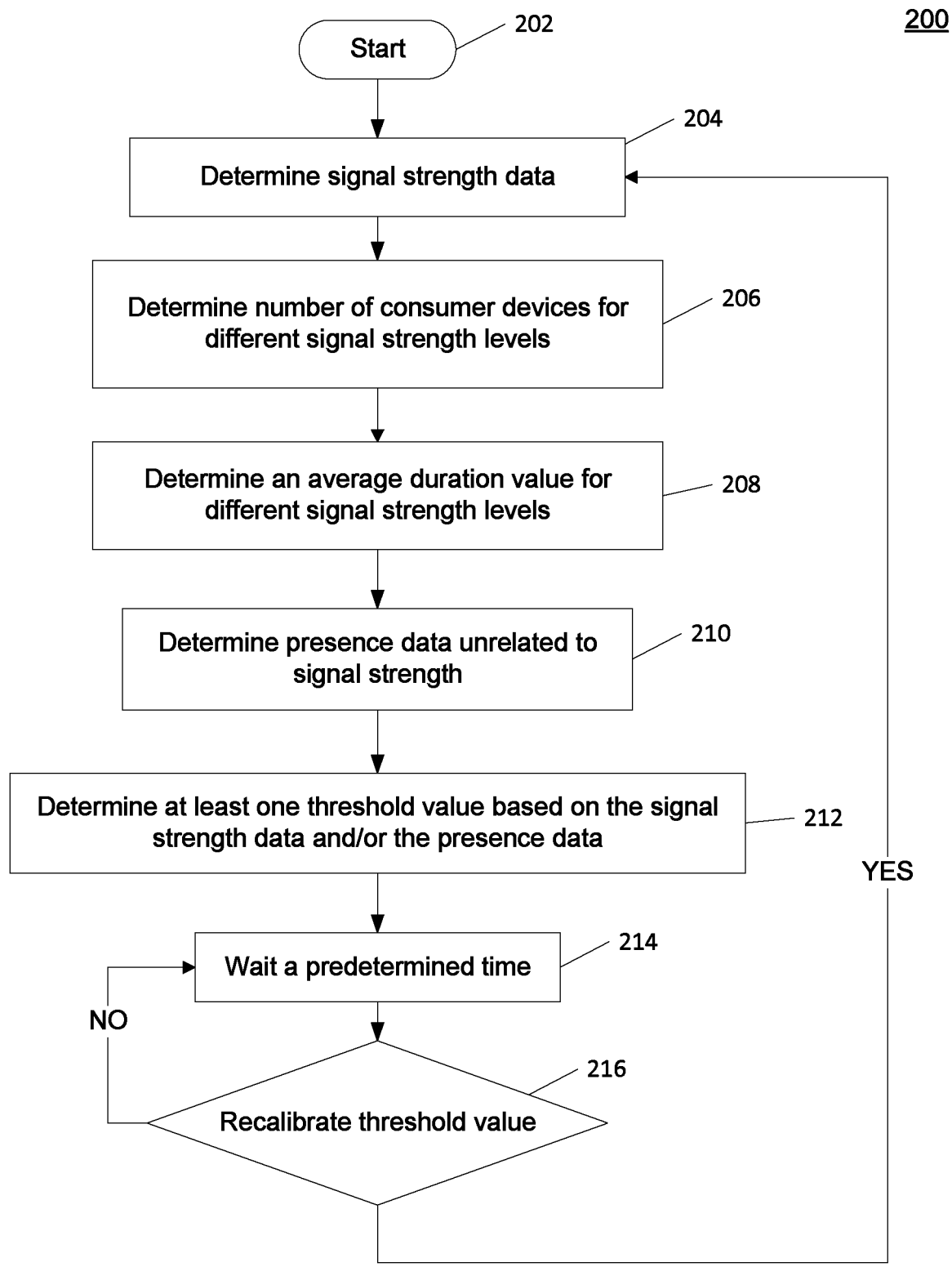
Figures 3A, 3B:
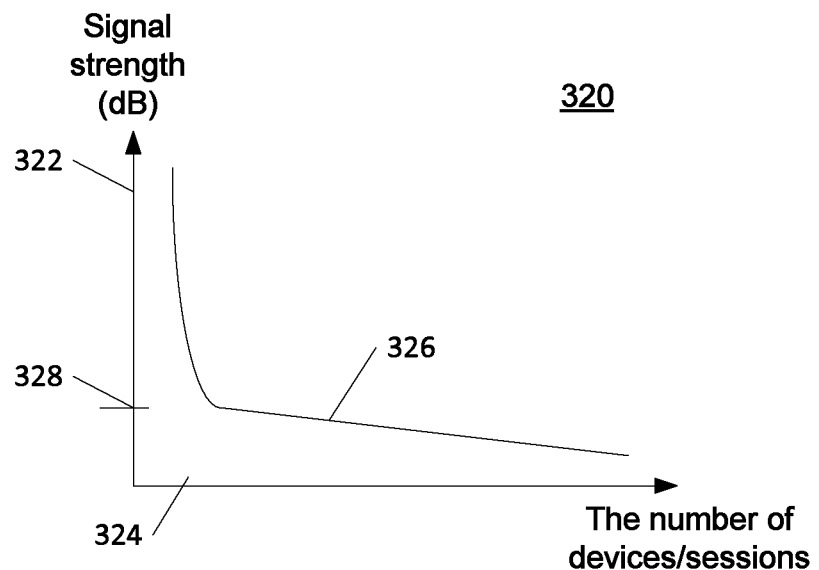
Figure 4:
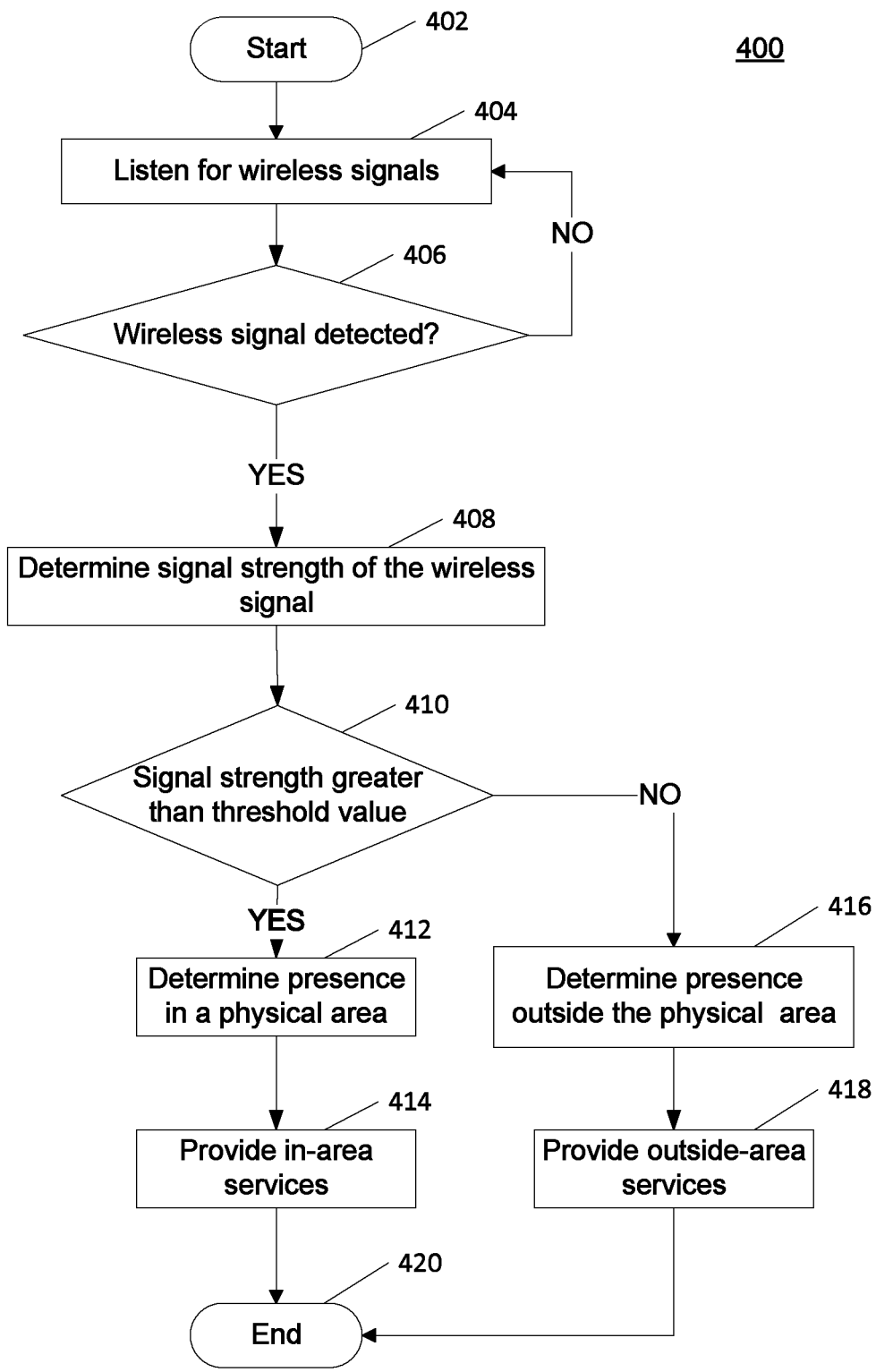
Figure 5:
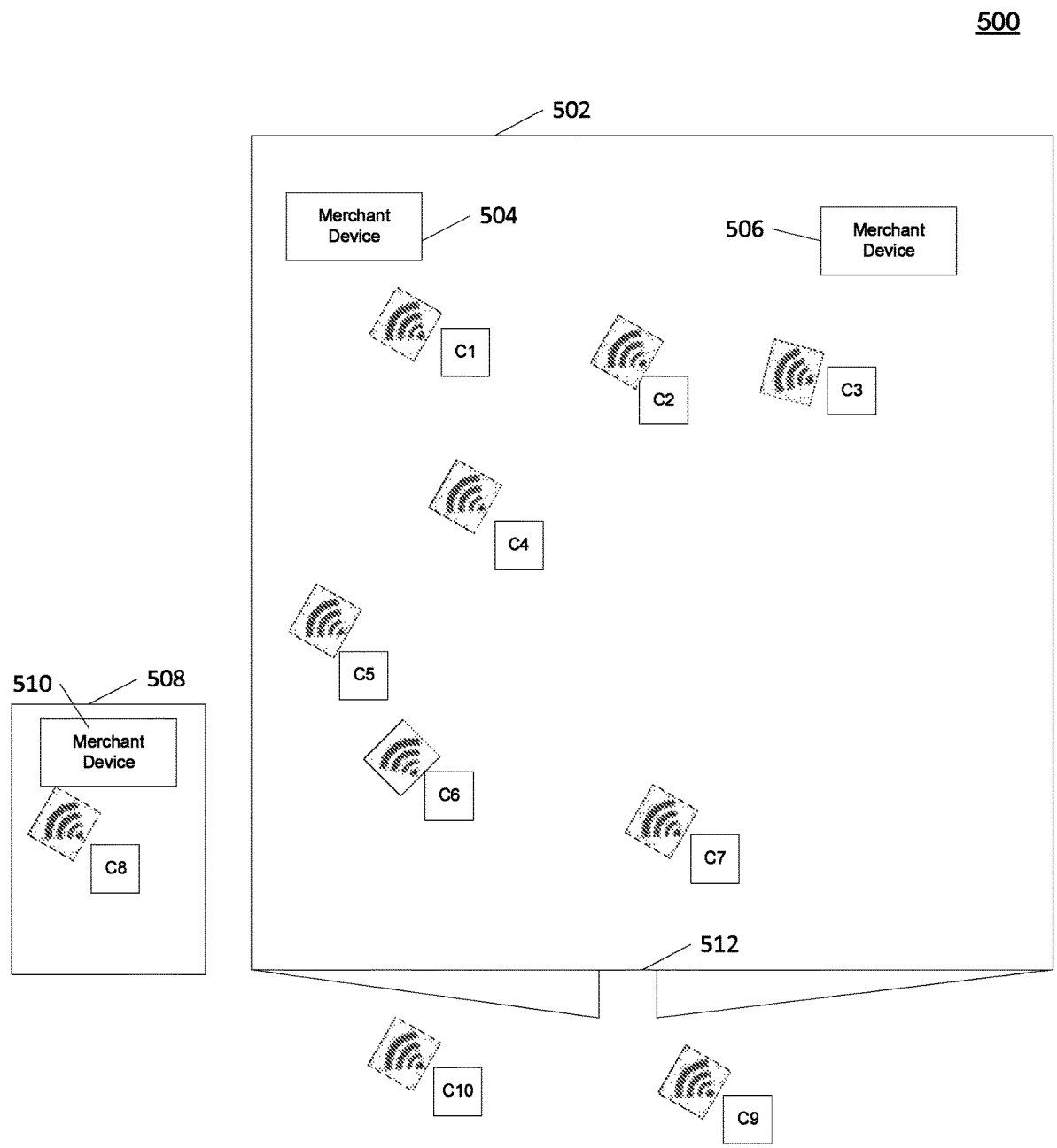
Figure 6:
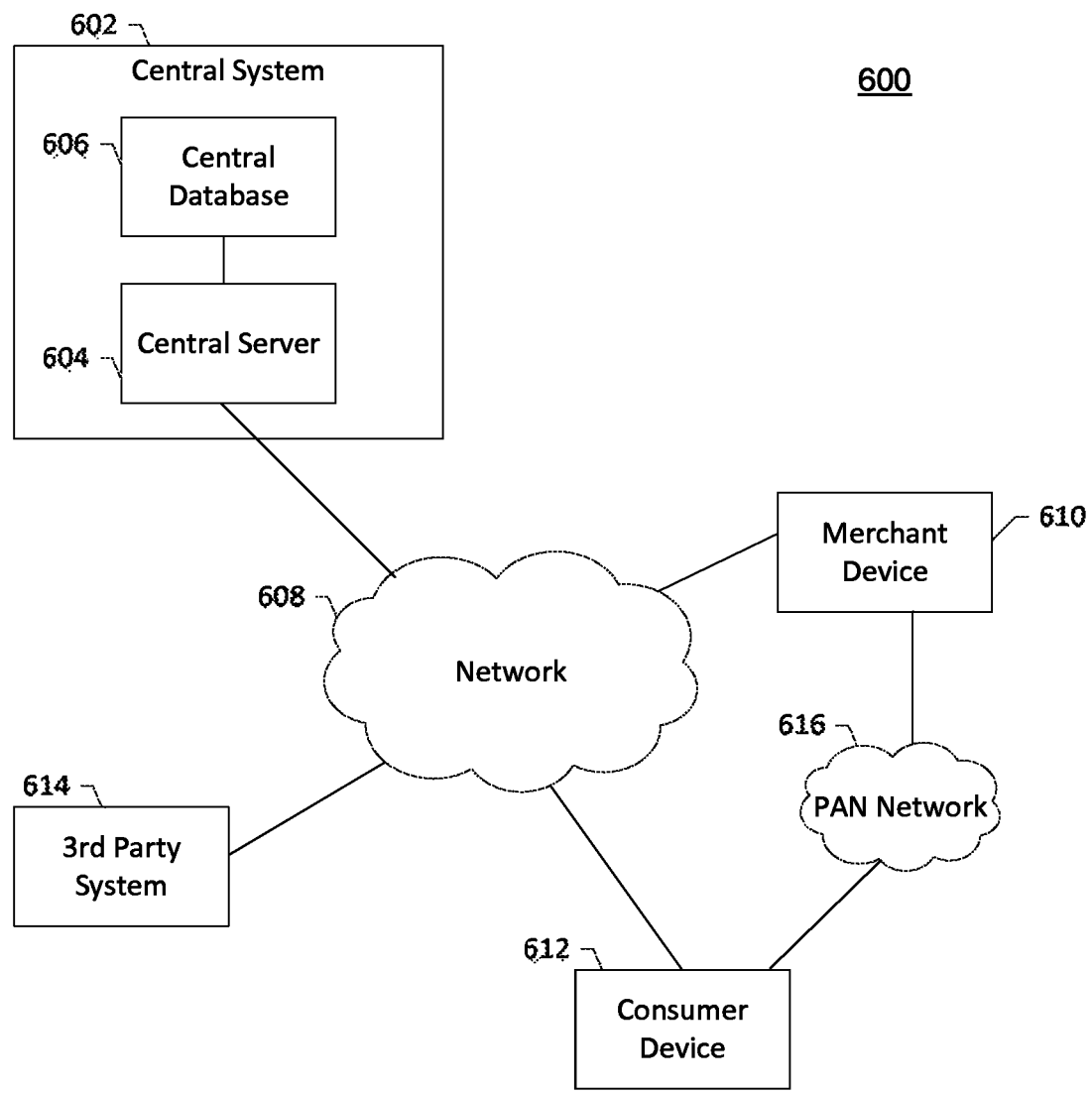
Figure 7:
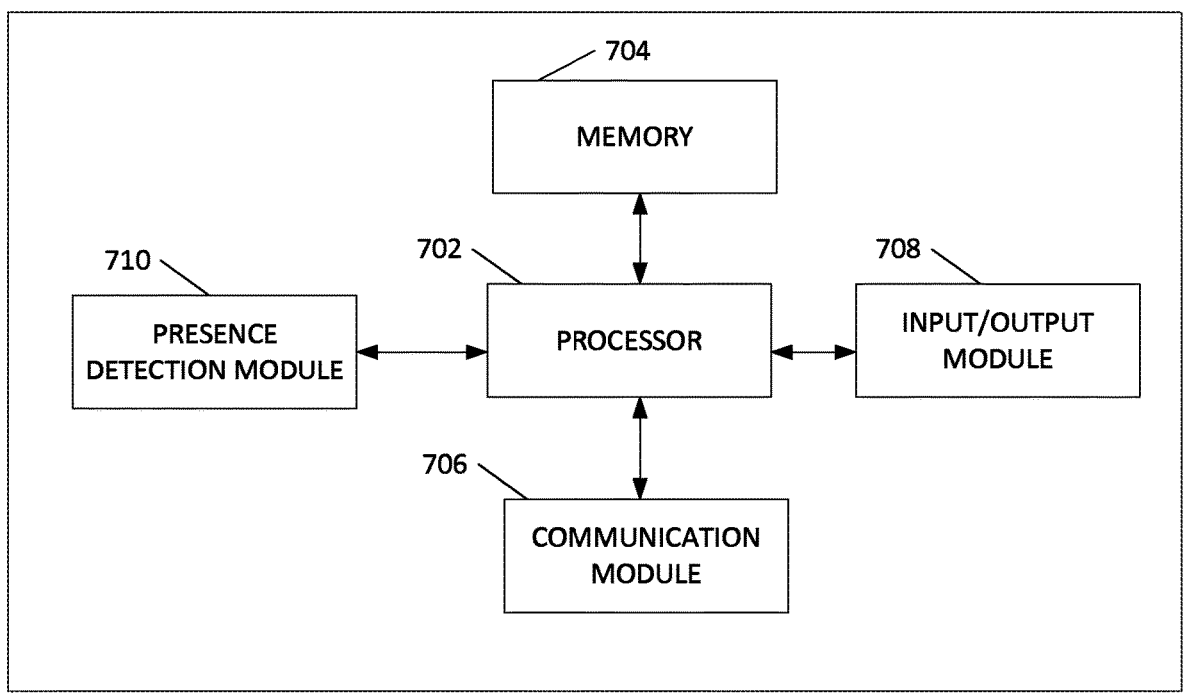

Having thus described some embodiments in general terms, reference will now be made to the accompanying drawings, which are not necessarily drawn to scale, and wherein:

FIGS. 1A and 1B shows flow charts of example methods for collecting signal strength data from a consumer device performed in accordance with some embodiments;

FIG. 2 shows a flow chart of an example method for determining a threshold signal strength value performed in accordance with some embodiments;

FIGS. 3A-3C show example relationships that may be determined via signal strength data in accordance with some embodiments;

FIG. 4 shows a flow chart of an example method for determining the presence of a consumer within a physical area performed in accordance with some embodiments;

FIG. 5 shows an example merchant's shop in accordance with some embodiments;

FIG. 6 shows an example system for determining consumer presence configured in accordance with some embodiments; and FIG. 7 shows an example schematic block diagram of circuitry configured in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Embodiments discussed herein may be configured to allow a merchant to determine the presence of a consumer (e.g., via a mobile device carried by the consumer and/or other type of machine) within a given physical area. Examples of physical areas may include the inside of a merchant's shop, a room within a building, another type of walled area, and/or a non-walled area within a larger area (e.g., portion of a large box store, department of a department store, table at a restaurant, seating/observation section at an arena, area within a predetermined distance of an outside location, and/or other type of defined area). As such, by determining when a person's device is present, some embodiments may extrapolate when a consumer is present, such as after entering a merchant's shop (e.g., as opposed to merely walking by the shop). Other example physical areas may include areas in proximity to (e.g., near or within a predetermined distance of) a point of sale device, kiosk, aisle, information desk, display, counter, dine-in location (e.g., a table), or any other device having a receiver that may wirelessly communicate with the consumer's device.

Embodiments discussed herein seek to utilize statistics related to the signal strength versus time and/or the number of devices that are detected within a range of signal strengths, among other data, to dynamically and programmatically determine when a device is "present" in a given area. In some embodiments, multiple signal strengths may be associated with a device during a session. As referred to herein, a "session" is defined as beginning when a device's transmitter is first detected as being in communicable range by a receiver and ends when the transmitter is no longer in communicable range. For example, when a user enters an area within range of a receiver, the session may begin. When the user leaves the area, the session may end. During the session, the receiver can log and/or otherwise store data related to the detected signal strength of the device and/or other parameters, including time.

During a session, multiple signal strengths may be detected and/or logged for any given device. In some embodiments, only one signal strength value may be stored and associated with the device's unique identifier at the end of the session. In such embodiments, the signal, saved signal strength may be the maximum signal strength detected during the session for the device. As such, some embodiments can be configured to utilize machine intelligence to learn (e.g., in real-time, including near real-time as referenced herein) what different signal strengths (or maximum signal strengths detected during a session) mean in different environments. For example, in relatively open environment where consumer devices are used while held in hand, the signal strength may be relatively proportionate to distance (e.g., the stronger the signal strength, the closer the transmitter is to the receiver). However, in other environments and/or when used in other manners, the signal strength may not be linearly proportionate to the distance between the receiver and the transmitter. For example, the transmitter may be in a cellular phone that is kept in a purse or bag, thus its signal strength may be lower than a phone that is being held in hand farther away. However, a phone being held in hand may not be detected for the same amount of time as a phone in a purse that is in a store. Thus, machine intelligence could be used to determine the signal strength versus time statistics and extrapolate which devices are located within a given area, and which are not.

Additional, non-signal strength data may also be used in some embodiments to weight signal strength data that is collected. For example, signal strength data of a device that is used to complete a payment transaction (e.g., facilitate the purchase of a product and/or redemption of a discount offer, such as a coupon) can cause that device's past signal strength history to be used as basis a signal strength signature of a device that is present in an area. As such, embodiments discussed herein can be configured to collect signal strength data from multiple devices and analyze the data to determine which devices are present within a predefined area. Some examples of how this may be implemented are discussed herein.

Collecting Signal Strength Data

FIG. 1A shows a flow chart of an example method 100A for collecting signal strength data from a consumer device during a session, which may be performed in accordance with some embodiments. In some embodiments, method 100A may be performed by a "merchant device" configured to detect the presence of mobile device held by consumers, or "consumer devices." The merchant device may be a point of sale device or any other device of the merchant, such as a dedicated wireless presence detector. The consumer device may be any mobile devices that transmit wireless signals, such as mobile phone, smartphone, portable digital assistant (PDA), PDA phone, device equipped with global positioning system, and/or the like. Either the consumer device or the merchant device, or both could be moveable or remain stationary depending on various applications.

While method 100A is described as being performed by a merchant device, some or all of the steps can also be performed by a central system. Furthermore, method 100A describes collecting signal strength data from a single consumer device, but may be performed to collect (e.g., simultaneously) signal strength data from multiple consumer devices.

The term "central system" as used herein refers to any marketing system, payment processing system, coupon provider system, and/or any other type of promotional system controlled by a merchant, third party and/or any other type of user (e.g., such as hardware provider, software application developer, online retailer, brick-and-mortar retailer, etc.). The central system may be accessible via one or more computing devices and may be operable to provide example promotion and/or marketing services on behalf of one or more providers that are offering one or more vouchers that are redeemable for goods, services, experiences and/or the like. The central system may be further configured to illustrate or otherwise inform one or more consumers of the availability of one or more vouchers (e.g., deals) in the form of one or more offers. In some examples, the central system may also take the form of a redemption authority or payment processor, it may provide rewards indications and/or it may function as an entity within a financial network. As such, the central system is, in some example embodiments, configured to present one or more offers, accept payments for offers from both merchants and consumers, upon acceptance of an offer, issue vouchers, indicate whether a voucher is valid for the purpose of redemption, generate rewards, provide a point of sale device or otherwise participate in the exchange of goods, services or experiences for currency and/or the like. In some embodiments discussed herein, the central system is referred to as a networked device.

Method 100A may start at step 102 and proceed to step 104, where the merchant device may be configured to listen for wireless signals. For example, the merchant device may be configured to connect with consumer devices that enter within a communicable range where data/signals can be transmitted and achieved between the merchant device and consumer device. In some embodiments, the local connection may be an unsecured network such as a personal area network (PAN), Bluetooth connection, public Wi-Fi connection, near field communication connection, etc. As such, the merchant device may be configured to listen to wireless signals from consumer devices via the local connection. Some embodiments may utilize a more secure connection (e.g., Wired Equivalent Privacy (WEP), Wi-Fi Protected Access (WIPA), Wi-Fi protected Access version 2 (WPA2), etc.).

At step 106, the merchant device may be configured to determine whether a wireless signal has been detected from a consumer device. The wireless signal may include signals for creating the connection between the merchant device and the consumer device. In other examples, when the local connection between the merchant device and a consumer device is formed, the devices may be configured to pass a variety of different information via wireless signals. For example, data may be passed that allows the merchant device to discover the identity of the consumer, to provide consumer information to the merchant device, to provide merchant, products, and/or promotional offer information to the consumer device, to make payments via consumer device, or the like. Additionally and/or alternatively, the wireless signal may simply include noise, random data, or the like. Virtually any communication may be used to determine whether a wireless signal has been detected from the consumer device. In some embodiments, one or more of the wireless signals passed in method 100A may be configured for the purpose of signal strength determination. If no wireless signals are detected, method 100A may return to step 104. If the wireless signal is detected, a timing device (e.g., clock, timer and/or other mechanism for tracking elapsed time) may start and method 100A may proceed to step 108.

At step 108, the merchant device may be configured to determine a signal strength of the wireless signal. Signal strength may generally provide an indication regarding the proximity of the consumer device that sent the wireless signal to the merchant device. For example, the stronger the signal strength, the closer the consumer device is likely to be with respect to the merchant device. In some embodiments, the merchant device may be configured to use received signal strength indication (RSSI) to determine the signal strength of the wireless signal. However, other techniques for determining signal strength and/or consumer device proximity may be used. In some examples, however, the signal strength may not be the only factor to determine the consumer device proximity. For example, signals sent by a consumer device in a direct line of sight from farther away may have stronger signal strength than signals sent by a consumer device around a corner. The signal strength may be determined as the maximum signal strength value.

At step 110, the merchant device may be configured to determine whether it has detected a new wireless signal from the consumer device. The discussion above at step 106 may be applicable at step 110. If no new wireless signal is in receipt by the merchant device, the merchant device may be configured to determine a duration time for the signal strength at step 116. The duration time represents the amount of time that the consumer device transmitted wireless signals at the signal strength, which may indicate an amount of time the consumer device was a certain distance from the merchant device. The duration time may be determined based on the timing device started at step 106. Then method 100A may be ended at step 120.

On the other hand, when the merchant device detects a new wireless signal, method 100A may proceed to step 112. At step 112, the merchant device may be configured to determine a signal strength of the new wireless signal. The discussion above at step 108 may be applicable at step 112.

The merchant device may be configured to compare signal strength of the wireless signals associated with each consumer device to determine and store the maximum signal strength value of that consumer device. For example at step 114, the merchant device may be configured to compare the signal strength determined at step 108 to the new signal strength determined at step 112. In an instance in which the signal strength is greater than the new signal strength, the maximum signal strength value may retain the signal strength of the wireless signal received at step 106. Method 100A may return to step 110 and awaiting a subsequent wireless signal.

In an instance in which the signal strength of the wireless signal received at step 106 is less than the new signal strength, the merchant device may be configured to determine the new signal strength as the maximum signal strength value at step 118. Then the merchant device is awaiting and listening to a subsequent wireless signal from the consumer device at step 110. The new wireless signal may become a previous wireless signal and be compared to signal strength of the subsequent wireless signal at step 114. In this case, the new signal strength value may be stored in the memory of merchant device.

FIG. 1B shows a flow chart of an example method 100B for collecting signal strength data from a consumer device during a session, which may be performed in accordance with some embodiments.

Method 100B may start at step 122 and proceed to step 124, where the merchant device may be configured to listen for wireless signals. For example, the merchant device may be configured to connect with consumer devices that enter within a communicable range where data/signals can be transmitted and achieved between the merchant device and consumer device. In some embodiments, the local connection may be an unsecured network such as a personal area network (PAN), Bluetooth connection, public Wi-Fi connection, near field communication connection, etc. As such, the merchant device may be configured to listen to wireless signals from consumer devices via the local connection. Some embodiments may utilize a more secure connection (e.g., Wired Equivalent Privacy (WEP), Wi-Fi Protected Access (WIPA), Wi-Fi protected Access version 2 (WPA2), etc.).

At step 126, the merchant device may be configured to determine whether a wireless signal has been detected from a consumer device. The first wireless signal may include signals for creating the connection between the merchant device and the consumer device. In other examples, when the local connection between the merchant device and a consumer device is formed, the devices may be configured to pass a variety of different information via wireless signals. For example, data may be passed that allows the merchant device to discover the identity of the consumer, to provide consumer information to the merchant device, to provide merchant, products, and/or promotional offer information to the consumer device, to make payments via consumer device, or the like. Additionally and/or alternatively, the first wireless signal may simply include noise, random data, or the like. Virtually any communication may be used to determine whether a first wireless signal has been detected from the consumer device. In some embodiments, one or more of the wireless signals may be passed in method 100B may be configured for the purpose of signal strength determination. If no wireless signals are detected, method 100B may return to step 124.

If the first wireless signal is detected, method 100B may proceed to step 128. At step 128, the merchant device may be configured to determine a first signal strength of the first wireless signal. Signal strength may generally provide an indication regarding the proximity of the consumer device that sent the first wireless signal to the merchant device. For example, the stronger the signal strength, the closer the consumer device is likely to be with respect to the merchant device. In some embodiments, the merchant device may be configured to use received signal strength indication (RSSI) to determine the first signal strength of the first wireless signal. However, other techniques for determining signal strength and/or consumer device proximity may be used. In some examples, however, the signal strength may not be the only factor to determine the consumer device proximity. For example, signals sent by a consumer device in a direct line of sight from farther away may have stronger signal strength than signals sent by a consumer device around a corner. In one embodiment, the first signal strength may be determined as the maximum signal strength value.

At step 130, the merchant device may be configured to start the timing device that is configured to measure one or more units of time. At step 132, the merchant device may be configured to wait a predetermined time. In some embodiments, this predetermined time may act as a polling frequency at which signal strength data is being acquired, thereby defining a polling interval between consecutive signal strength data acquisitions for the same consumer device. The predetermined time could be set lower, for example, to acquire larger data sets. The predetermined time could also be set higher, for example, to conserve power (e.g., of consumer and/or merchant devices) or avoid excessive data generation. In various embodiments, the merchant device may be configured to allow a merchant and/or the central system to set the predetermined time. For example, in some embodiments, units of time may be defined by the number of polling intervals. As another example, the units of time may be defined as a fraction of a second (e.g., 10 milliseconds).

At step 134, the merchant device may be configured to determine whether it has detected a second wireless signal from the consumer device after the predetermined time. The discussion above at step 126 may be applicable at step 134. When the merchant device detects the second wireless signal after the predetermined time, method 100B may proceed to step 136.

At step 136, the merchant device may be configured to determine a second signal strength of the second wireless signal. The discussion above at step 128 may be applicable at 116.

At step 138, the merchant device may be configured to determine whether the first signal strength is the same (e.g., within a predetermined margin of error, tolerance, etc.) as second signal strength. If first signal strength is the same as the second signal strength, method 100B may return to step 132. The timing device started at step 130 is not restarted (e.g., continues counting or "running") and the merchant device waits another cycle of the predetermined time, attempts to detect another wireless signal from the consumer device, and so forth.

Returning to step 138, when the first signal strength is determined to be different (e.g., outside the predetermined margin of error, tolerance, etc.) as the second signal strength, method 100B may proceed to step 140.

At step 140, the merchant device may be configured to determine a duration time for the first signal strength. The duration time represents the amount of time that the consumer device transmitted wireless signals at the first signal strength, which may indicate an amount of time the consumer device was a certain distance from the merchant device. The duration time may be determined based on the timing device started at step 130, which may include one or more accumulations of the predetermined time discussed at step 132.

At step 142, the merchant device may be configured to store the duration time and the first signal strength. In some embodiments, the signal strength data generated by method 100B may include the duration time of the first signal strength and the first signal strength. The signal strength data may be stored in a memory of merchant device. Additionally and/or alternatively, the signal strength data could be sent to a central system for storage and/or processing.

At step 144, the timing device may be reset. Method 100B may then return to 112, where the merchant device may be configured to wait the predetermined time before attempting to detect another wireless signal from the consumer device, and so forth.

Returning, the step 134, if the merchant device does not detect the second wireless signal after the predetermined time, method 100B may proceed to step 146. Here, the consumer device may have moved outside of a communicable range of the local connection. As discussed above, method 100B may be performed to gather signal strength data, which may be leveraged to determine a consumer's location within a physical area. As such, the local connection may be configured such that the communicable range between the consumer device and the merchant device is greater than the physical area when signal strength data at such distances are desired.

At step 146, the merchant device may be configured to determine a duration time for the first signal strength. The discussion above at step 140 may be applicable at step 146. At 18, the merchant device may be configured to store the duration time and the first signal strength (e.g., as signal strength data). The discussion above at step 142 may be applicable at step 148. Method 100B may then end at step 150.

In some embodiments, method 100B may be performed when the merchant device is moved. The merchant device may be configured to remain relatively stationary during operation such that collected signal strength data remains accurate. For example, the merchant device may be a POS device stationed at a counter, checkout, or the like. When the merchant device is moved for any purpose, method 100B may be performed. Additionally and/or alternatively, method 100B may be performed at various times (e.g., scheduled, as requested, etc.) to address merchant device movement and/or sensor recalibration.

Determining a Threshold Signal Strength Value

FIG. 2 shows a flow chart of an example method 200 for determining a threshold signal strength value, or "threshold value," performed in accordance with some embodiments. The threshold value, as used herein, refers to a value of signal strength that marks the difference between the consumer device being within a physical area or outside of the physical. In some embodiments, method 200 may be performed after methods 100A or 100B, such as by using the signal strength data determined via methods 100A or 100B.

Method 200 is described as being performed by a merchant device, but some or all of the steps can also be performed by a central system. For example, in some embodiments, data collection (e.g., methods 100A and 100B) can be handled by the merchant device while the data processing of method 200 may be performed by the central system. The central system may be configured to perform method 200 for a plurality of different merchant device, associated with the same merchant or with different merchants.

Method 200 may begin at step 202 and proceed to step 204, where the merchant device may be configured to determine the signal strength data. The signal strength data may be data collected from multiple consumer devices and/or over a period of time that involves many sessions with one or more consumer devices. The period of time, for example, may be hourly, daily, weekly, monthly, etc. In some embodiments, the period of time may be predetermined and/or configured by the merchant and/or central system based on how many and how frequently sessions occur.

In some embodiments, determining the signal strength data may include performing methods 100A or 100B. For example, the merchant device may be configured to access signal strength data that the merchant device collected and/or stored. To avoid unnecessarily overcomplicating the discussion, method 200 is referred to as being executed by a merchant device. However, in some embodiments, method 200 (like other methods discussed herein) can be partially or wholly performed by a central system, a central merchant device (i.e., master/server device that is separate from the device(s) having the signal strength detector/receiver components), a second merchant device (a peer device), or some device other than the device used for collecting the signal strength data. In such embodiments, the other device(s) may be configured to receive the signal strength data from the collecting device (e.g., in real-time as collection takes place or as a batch of data). The signal strength data may be received via the local connection (e.g., PAN, Bluetooth, etc.) and/or may be received via any other wired and/or wireless connection(s), including the Internet.

At step 206, the merchant device may be configured to determine a number of consumer devices associated with different signal strength levels. Because the signal strength data may include information (e.g., identifier) that is unique to a specific mobile device, the merchant device may classify the number of consumer devices according to signal strength levels based on the signal strength data. An example relationship between the number of consumer devices and signal strength values is shown in example chart 300 in FIG. 3A, where signal strength values is shown at 302 and number of consumer devices is shown at 304. The example relationship shown may be applicable to a retailer at a mall, where appreciably more consumers walk by the shop than enter the shop. In some embodiments, each signal strength value may represent the maximum signal strength value collected from a device during a session, examples of which are discussed above. Here, the number of consumer devices falls quickly at signal strengths between 1.0-1.5 dB at 306, which may indicate that the threshold value for determining presence based on signal strength in this example environment could be set at 1.0-1.5 dB.

The example relationship shown in chart 300 is also shown in graph 320 in FIG. 3B, where the signal strength is shown along axis 322 and the number of consumer devices and/or sessions is shown along axis 324. Here, plot 326 represents the example relationship and the threshold value (e.g., at 1.0-1.5 dB) is shown at 328.

Returning to FIG. 2, at step 208 of method 200, the merchant device may be configured to determine an average duration for different signal strength levels. The relationship between average duration and the different signal strength levels may be determined based on the signal strength data. FIG. 3C shows an example chart 340 that includes an example relationship between signal strength (e.g., shown at 342) and average duration time (e.g., shown at 344). The duration at which consumer devices are recorded at various signal strengths may determine the signal strengths that correspond with being within the physical area. Returning to the example of a retail store at the mall, consumers that enter the shop will typically stay longer and as such, will be detected by the merchant device for greater durations, than consumers that simply walk past the shop. Here, the duration time in which a particular signal strength is detected increases quickly at signal strengths between 1.0-1.5 dB at 346, which may indicate that the threshold value for signal strength could be set at 1.0-1.5 dB. However, in some embodiments, step 208, like other functionality discussed herein may be omitted. For example, embodiments such as those consistent with FIG. 1A may omit step 208, because it would make little difference how long a signal strength is attained when the maximum signal strength is of primary importance for determining presence.

At 210, the merchant device may be configured to determine presence data unrelated to signal strength (e.g., the signal strength data). Presence data, as used herein, refers to data related to the presence and/or location of consumers other than signal strength data. Some examples of presence data are discussed below.

For example and as described above, signal strength may be not the only factor to determine the presence of customers. In some embodiments, a consumer device may be used to facilitate payment using near field communication to establish radio communication between the consumer device and the merchant device by bringing the consumer device and the merchant device into close proximity. A consumer device may also be used to facilitate a transaction using Bluetooth wireless technology to create personal area network for exchanging data over short distances. As such, the transactions made by these consumer devices using near field communication and/or Bluetooth wireless technology may be used to determine the presence and/or location of consumers.

In another embodiment, a consumer device may be used to complete a purchase of a product by presenting a discount offer, such as a coupon that is scannable. Redemption of the discount offer may indicate presence of the consumer which can be used to determine the presence of the customer. Signal strength data of a consumer device that is used to complete payment of transactions may cause the signal strength data to be weighted and cause that device's past signal strength history to be used as basis of a signal strength signature of a device that is present in an area.

Still in another embodiment, when consumer devices are equipped with global positioning information (GPS), GPS and/or wireless network information may be used to compute the presence and/or location of consumers to determine the presence data.

Familiarity may also be used as an addition to the signal strength to determine the presence of a customer. For example, mobile devices of ladies may send signals with weaker signal strength than those of men's because ladies usually put their mobile devices in their purses while men usually put in their pockets. Most customers of a spa store, however, may be ladies. As such, simply using the signal strength may not be sufficient to determine the presence of customers. Addition of familiarity may help to enhance the accuracy of determining the presence data.

In addition to the situations described above, there may be other information that can be used to determine the presence data, such as the number of transactions made over a period of time, Wi-Fi user information.

At step 212, the merchant device may be configured to determine at least one threshold value based on the signal strength data and/or the presence data. The determination may be performed based on one or more of the determinations at steps 206-210. For example, the threshold value may be based on the minimum signal strength that has an average visit length (e.g., duration) of at least 30 seconds. In some embodiments, the threshold value suggested by the determinations at steps 206-210 could be averaged or otherwise combined to produce the at least one threshold value. Alternatively and/or additionally, techniques may be used to throw out bad or otherwise unreliable threshold values determined at steps 206-210.

In some embodiments, the threshold value may also depend on the nature of the wireless signals. For example, the threshold value may be a function that varies with frequency of the wireless signals, may depend on the nature of the local connection and/or protocols used (e.g., Bluetooth, DECT, etc.).

At step 214, the merchant device may be configured to wait a predetermined time. The predetermined time may be based on the desired number of recalibrations of the threshold value. In some embodiments, the merchant device may include location tracking capability such that the merchant device, a second device, and/or the central system may be configured to determine that the merchant device has moved. Upon detecting that the merchant device has moved, the predetermined time may end. Additionally and/or alternatively, the predetermined period of time may be on a scheduled basis and/or configured by the merchant device, second device and/or central system.

If the predetermined time has ended, method 200 may proceed to step 216. At step 216, the merchant device may be configured to determine whether to recalibrate the threshold value. In some embodiments, this may include determining whether the merchant device has moved such that the recalibration is needed. If recalibration of the threshold value is needed, method 200 may return to step 204. If recalibration is not needed, method 200 may return to step 214.

Determining Consumer Presence

FIG. 4 shows a flow chart of an example method 400 for determining the presence of a consumer within a physical area, performed in accordance with some embodiments. Method 400 may be performed after methods 100A or 100B, where signal strength data is collected, and method 200, where a threshold value is determined based on the signal strength data. In some embodiments, method 400 may be performed by the same device that performed methods 100A, 100B and/or 200. In one example, a merchant device may perform methods 100A, 100B and 400, while the central system may perform method 200. In another example, the merchant device may perform methods 100A, 100B, 200 and 400.

Method 400 may start at step 402 and proceed to step 404, where the merchant device may be configured to listen for wireless signals. At step 406, the merchant device may be configured to determine whether a wireless signal has been detected. If the wireless signal is not detected (e.g., no consumer devices within communicable range), method 400 may return to step 404. If the wireless signal is detected, method 400 may proceed to step 408, where the merchant device may be configured to determine a signal strength of the wireless signal. The discussion above at steps 104, 106 and 108 of method 100A, steps 122, 126 and 128 of method 100B may be applicable at steps 404, 406 and 408, respectively.

At 410, the merchant device may be configured to determine whether the signal strength is greater than (which may include equal to) the threshold value (e.g., as determined via method 200). If the signal strength is greater than the threshold value, method 400 may proceed to step 412, where the merchant device may be configured to determine that the consumer is present in a physical area. As discussed above, high signal strength indicates that the consumer device is closer to the merchant device relative to a location with low signal strength. The threshold value may act as the signal strength level that marks the boundary of the physical area.

At step 414, the merchant device may be configured to provide in-area services. An in-area service, as used herein, refers to any service that is relevant to consumers within the physical area. For example, if the physical area is the inside of a restaurant, in-area services may include placing the consumer in a seating wait list and/or assigning the consumer to a table. In another example, if the physical area is the inside of a retail store, the in-area services may include sending a sales representative. In yet another example, if the physical area is near a point of sale device, information desk, product display, or kiosk, a suitable employee of the merchant may be sent to the consumer to provide assistance and/or a suitable promotional offer may be sent to the consumer device.

FIG. 5 shows an example merchant's shop 500, in accordance with some embodiments. Merchant shop 500 may include a physical area 502, which is shown as the interior of merchant shop 500. One or more merchant devices 504 and 506 may be located within merchant shop 500. A wireless receiver (not shown) may be configured to receive wireless signals from consumer devices C1-C10. Here, consumer devices C1-C7 may be determined to be within the physical area 502 (e.g., upon entering via entrance 512), and accordingly, may be provided with in-area services.

Returning to step 410, if the signal strength is determined to be less than the threshold value, method 400 may proceed to step 416. At step 416, the merchant device may be configured to determine that the consumer is present outside of the physical area. As shown in FIG. 5, consumer devices C8-C10 are shown as being outside of physical area 502.

At step 418, the merchant device may be configured to provide outside-area services. An outside-area service, as used herein, refers to any service that is relevant to consumers outside the physical area. For example, as shown in FIG. 5, the physical area may be an indoor seating area at a restaurant that also includes an outdoor seating area, such as terrace 508. As such, dining services may be provided to the consumer of consumer device C8. Additionally and/or alternatively, the merchant may leverage multiple merchant devices. For example, merchant device 510 may be used for a physical area defined by terrace 508 while merchant devices 504 and/or 506 may each be used for some or all of the physical area 502. In some embodiments, the use of multiple merchant devices for the same physical area may allow for more accurate consumer device location determination, such as via signal triangulation. In some embodiments, the merchant device may be configured to perform no outside-area services for the consumer (e.g., a passerby, such as consumer devices C9 and C10 shown in FIG. 5). Method 400 may then end.

Exemplary System Architecture

FIG. 6 shows system 600 including an example network architecture, which may include one or more devices and sub-systems that are configured to implement some embodiments discussed herein. For example, system 600 may include central system 602, which can include, for example, central server 604 and central database 606, among other things (not shown). Central server 604 may be any suitable network server, a plurality of networked servers, and/or other type of processing device. Central database 606 may be any suitable network database configured to store information that may be used to facilitate the techniques as discussed herein. In this regard, system 602 may include, for example, at least one backend data server, network database, cloud computing device, among other things.

Central system 602 may be coupled to one or more merchant devices (e.g., merchant device 610) via network 608. In this regard, network 608 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 608 may include a cellular telephone, an 802.11, 802.16, 802.20, and/or WiMax network. Further, the network 608 may include a public network, such as the Internet, a private network, such as an intranet, or combinations thereof, and may utilize a variety of networking protocols now available or later developed including, but not limited to TCP/IP based networking protocols.

Merchant device 610 may be associated with a merchant, such as a retail store, restaurant, etc. or one or more employees of the merchant. In some embodiments, merchant device 610 may be a POS device that is configured to receive payments at the merchant's shop. As such, merchant device 610 may include a personal computer and/or other networked device, such as a cellular phone, tablet computer, mobile device, etc., that may be used for any suitable purpose in addition to providing POS functionality at the restaurant.

System 600 may further include one or more consumer devices (e.g., consumer device 612). Consumer device 612 may connect with merchant device 610 via network 608 and/or PAN network 616. As such, consumer device 612 may be configured to communicate with merchant device 610 via PAN network 616 even if consumer device 612 and/or merchant device 610 do not have active connections with network 608.

In some embodiments, central system 600 may further include one or more third party systems (e.g., third party system 614), among other things. In some embodiments, different third party systems may be associated with different types of payment sources or payment destinations for payments made via consumer device. Thus for each payment source or destination, data may be sent to an appropriate third party system (e.g., a credit card transaction server, a bank account, etc.) to validate and/or process payments. Furthermore, employee accounts, merchant accounts, and/or consumer payment accounts may be associated with one or more third party accounts that are provided by third party system 2714. In some embodiments, one or more third party servers may be configured to perform the functionality described herein with respect to central system 602.

In some embodiments, central system 602 may be a multi-tenant database system configured to provide services to a plurality of consumers and merchants. Additionally and/or alternatively, central system 602 may be configured to include, or work in connection with, online ordering systems (e.g., shop online and pickup), promotional systems (e.g., deal voucher accounts, rewards, offerings, purchases, and redemptions, where the value of a redeemed voucher may be deducted from the payment), merchant systems (e.g., kitchen systems for restaurants), and/or appointment systems (e.g., scheduling a reservation at a restaurant). As such, the techniques disclosed herein may be applicable to any environment that involves consumer and merchants.

FIG. 7 shows a schematic block diagram of circuitry 700, some or all of which may be included in, for example, central system 604, consumer device 612, and/or merchant device 610. In accordance with some example embodiments, circuitry 700 may include various means, such as one or more processors 702, memories 704, communications modules 706, and/or input/output modules 708.

In some embodiments, such as when circuitry 700 is included in merchant device 610 and/or central system 602, presence detection module 710 may also or instead be included. As referred to herein, "module" includes hardware, software and/or firmware configured to perform one or more particular functions described herein. In this regard, the means of circuitry 700 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 704) that is executable by a suitably configured processing device (e.g., processor 702), or some combination thereof.

Processor 702 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 7 as a single processor, in some embodiments, processor 702 comprises a plurality of processors. The plurality of processors may be embodied on a single computing device or may be distributed across a plurality of computing devices collectively configured to function as circuitry 700. The plurality of processors may be in operative communication with each other and may be collectively configured to perform one or more functionalities of circuitry 700 as described herein. In an example embodiment, processor 702 is configured to execute instructions stored in memory 704 or otherwise accessible to processor 702. These instructions, when executed by processor 702, may cause circuitry 700 to perform one or more of the functionalities of circuitry 700 as described herein.

Whether configured by hardware, firmware/software methods, or by a combination thereof, processor 702 may comprise an entity capable of performing operations according to embodiments of the present invention while configured accordingly. Thus, for example, when processor 702 is embodied as an ASIC, FPGA or the like, processor 702 may comprise specifically configured hardware for conducting one or more operations described herein. As another example, when processor 702 is embodied as an executor of instructions, such as may be stored in memory 704, the instructions may specifically configure processor 702 to perform one or more algorithms and operations described herein.

Memory 704 may comprise, for example, volatile memory, non-volatile memory, or some combination thereof. Although illustrated in FIG. 7 as a single memory, memory 704 may comprise a plurality of memory components. The plurality of memory components may be embodied on a single computing device or distributed across a plurality of computing devices. In various embodiments, memory 704 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 704 may be configured to store information, data, applications, instructions, or the like for enabling circuitry 2800 to carry out various functions in accordance with example embodiments discussed herein. For example, in at least some embodiments, memory 704 is configured to buffer input data for processing by processor 702. Additionally or alternatively, in at least some embodiments, memory 704 may be configured to store program instructions for execution by processor 702. Memory 704 may store information in the form of static and/or dynamic information. This stored information may be stored and/or used by circuitry 700 during the course of performing its functionalities.

Communications module 706 may be embodied as any device or means embodied in circuitry, hardware, a computer program product comprising computer readable program instructions stored on a computer readable medium (e.g., memory 704) and executed by a processing device (e.g., processor 702), or a combination thereof that is configured to receive and/or transmit data from/to another device, such as, for example, a second circuitry 700 and/or the like. In some embodiments, communications module 706 (like other components discussed herein) can be at least partially embodied as or otherwise controlled by processor 702. In this regard, communications module 706 may be in communication with processor 702, such as via a bus. Communications module 706 may include, for example, an antenna, a transmitter, a receiver, a transceiver, network interface card and/or supporting hardware and/or firmware/software for enabling communications with another computing device. Communications module 706 may be configured to receive and/or transmit any data that may be stored by memory 704 using any protocol that may be used for communications between computing devices. Communications module 706 may additionally or alternatively be in communication with the memory 704, input/output module 708 and/or any other component of circuitry 700, such as via a bus.

Input/output module 708 may be in communication with processor 702 to receive an indication of a user input and/or to provide an audible, visual, mechanical, or other output to a user. Some example visual outputs that may be provided to a user by circuitry 700 are discussed in connection with the displays described above. As such, input/output module 2808 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 700 is embodied as a server or database, aspects of input/output module 708 may be reduced as compared to embodiments where circuitry 700 is implemented as an end-user machine (e.g., consumer device and/or merchant device) or other type of device designed for complex user interactions. In some embodiments (like other components discussed herein), input/output module 708 may even be eliminated from circuitry 700. Alternatively, such as in embodiments wherein circuitry 700 is embodied as a server or database, at least some aspects of input/output module 708 may be embodied on an apparatus used by a user that is in communication with circuitry 700, such as for example, merchant device 610 and/or consumer device 612. Input/output module 708 may be in communication with memory 704, communications module 706, and/or any other component(s), such as via a bus. Although more than one input/output module and/or other component can be included in circuitry 700, only one is shown in FIG. 7 to avoid overcomplicating the drawing (like the other components discussed herein).

Presence detection module 710 may also or instead be included and configured to perform the functionality discussed herein related to consumer presence detection. In some embodiments, some or all of the functionality may be performed by processor 702. In this regard, the example processes and algorithms discussed herein can be performed by at least one processor 702 and/or presence detection module 710. For example, non-transitory computer readable storage media can be configured to store firmware, one or more application programs, and/or other software, which include instructions and other computer-readable program code portions that can be executed to control processors of the components of system 700 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. Each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 702 and/or presence detection module 710 discussed above with reference to FIG. 7, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 704) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

CONCLUSION

Many modifications and other embodiments of the inventions set forth herein will come to mind to one skilled in the art to which these embodiments of the invention pertain having the benefit of the teachings presented in the foregoing descriptions and the associated drawings. For example, while some embodiments discussed herein are used in the context of merchants and consumers, similar techniques may be applicable to other environments in which a person's presence within a physical location needs to be determined. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
receiving, by a merchant device, one or more wireless signals from consumer devices that are in communicable range of the merchant device, wherein each of the one or more wireless signals is configured to transmit at least one unique identifier, each of the unique identifiers respectively associated with a corresponding consumer device;
generating signal strength data for each of the consumer devices based at least in part on analyzing the one or more wireless signals, the signal strength data for each of the consumer devices comprising at least one signal strength value and a corresponding signal strength duration value associated with each of the one or more wireless signals associated with the unique identifier of the corresponding consumer device;
determining presence data associated with at least a subset of the consumer devices, wherein the presence data is independent of the signal strength data and indicates that the subset of consumer devices is within a defined physical area;
analyzing the signal strength data to determine quantities of the consumer devices that achieved each of various signal strength ranges and to determine an average signal strength duration corresponding to each of the various signal strength ranges;
determining a first threshold signal strength value based, at least in part, on analyzing the quantities of the consumer devices corresponding to the various signal strength ranges;
determining a second threshold signal strength value based, at least in part, on analyzing average signal strength durations corresponding to the various signal strength ranges;
determining a third threshold signal strength value based, at least in part, on analyzing a historical signal strength data associated with the subset of the consumer devices indicated to be within the defined physical area based on the presence data;

generating a calibrated threshold signal strength value based, at least in part, on analyzing the first, second, and third threshold signal strength values;

determining a first selected consumer device is present within the defined physical area when a first selected signal strength value associated with the unique identifier of the first selected consumer device satisfies the calibrated threshold signal strength value; and determining a second selected consumer device is outside the defined physical area when a second selected signal strength value associated with the unique identifier of the second selected consumer device does not satisfy the calibrated threshold signal strength value.

2. The method of claim 1, wherein generating the calibrated threshold signal strength value based, at least in part, on analyzing the first, second, and third threshold signal strength values comprises averaging the first, second, and third threshold signal strength values.

3. The method of claim 1, wherein analyzing the first, second, and third threshold signal strength values comprises determining whether any of the first, second, and third threshold signal strength values is unreliable.

4. The method of claim 3, wherein, upon determination that at least one of the first, second, and third threshold signal strength values is unreliable, disregarding the at least one of the first, second, and third threshold signal strength values determined to be unreliable.

5. The method of claim 4, wherein in an instance where the first threshold signal strength value is determined to be unreliable, generating the calibrated threshold signal strength value comprises averaging the second and third threshold signal strength values.

6. The method of claim 4, wherein in an instance where the first threshold signal strength value and the second threshold signal strength value are determined to be unreliable, generating the calibrated threshold signal strength value comprises assigning the third threshold signal strength value as the calibrated threshold signal strength value.

7. The method of claim 1, wherein the presence data comprises data generated via near field communication or Bluetooth wireless technology between the merchant device and the subset of consumer devices.

8. The method of claim 7, wherein the data generated via near field communication or Bluetooth wireless technology between the merchant device and the subset of consumer devices is associated with facilitating payment of a transaction to complete a purchase of a product within the defined physical area.

9. The method of claim 1, wherein the presence data comprises promotion redemption data indicating redemption of a promotion, coupon, discount offer within the defined physical area.

10. The method of claim 1, wherein the presence data comprises GPS location data corresponding to the defined physical area.

11. The method of claim 1, wherein the presence data comprises familiarity data associated with a user or the unique identifier corresponding to at least one of the consumer devices of the subset of the consumer devices.

12. A merchant device comprising:

a wireless receiver, configured to:

receive one or more wireless signals from consumer devices that are in communicable range of the merchant device, wherein each of the one or more wireless signals is configured to transmit at least one unique identifier, each of the unique identifiers respectively associated with a corresponding consumer device; and a processor and a memory, the memory including computer program instructions which when executed, cause the processor to:

generate signal strength data for each of the consumer devices based at least in part on analyzing the one or more wireless signals, the signal strength data for each of the consumer devices comprising at least one signal strength value and a corresponding signal strength duration value associated with each of the one or more wireless signals associated with the unique identifier of the corresponding consumer device;

determine presence data associated with at least a subset of the consumer devices, wherein the presence data is independent of the signal strength data and indicates that the subset of consumer devices is within a defined physical area;

analyze the signal strength data to determine quantities of the consumer devices that achieved each of various signal strength ranges and to determine an average signal strength duration corresponding to each of the various signal strength ranges;

determine a first threshold signal strength value based, at least in part, on analyzing the quantities of the consumer devices corresponding to the various signal strength ranges;

determine a second threshold signal strength value based, at least in part, on analyzing average signal strength durations corresponding to the various signal strength ranges;

determine a third threshold signal strength value based, at least in part, on analyzing a historical signal strength data associated with the subset of the consumer devices indicated to be within the defined physical area based on the presence data;

generate a calibrated threshold signal strength value based, at least in part, on analyzing the first, second, and third threshold signal strength values;

determine a first selected consumer device is present within the defined physical area when a first selected signal strength value associated with the unique identifier of the first selected consumer device satisfies the calibrated threshold signal strength value; and determine a second selected consumer device is outside the defined physical area when a second selected signal strength value associated with the unique identifier of the second selected consumer device does not satisfy the calibrated threshold signal strength value.

13. The merchant device of claim 12, wherein generating the calibrated threshold signal strength value based, at least in part, on analyzing the first, second, and third threshold signal strength values comprises averaging the first, second, and third threshold signal strength values.

14. The merchant device of claim 12, wherein analyzing the first, second, and third threshold signal strength values comprises determining whether any of the first, second, and third threshold signal strength values is unreliable.

15. The merchant device of claim 14, wherein, upon determination that at least one of the first, second, and third threshold signal strength values is unreliable, the computer program instructions, when executed, cause the processor to disregard the at least one of the first, second, and third threshold signal strength values determined to be unreliable.

16. The merchant device of claim 15, wherein in an instance where the first threshold signal strength value is determined to be unreliable, generating the calibrated threshold signal strength value comprises averaging the second and third threshold signal strength values.

17. The merchant device of claim 15, wherein in an instance where the first threshold signal strength value and the second threshold signal strength value are determined to be unreliable, generating the calibrated threshold signal strength value comprises assigning the third threshold signal strength value as the calibrated threshold signal strength value.

18. The merchant device of claim 12, wherein the presence data comprises data generated via near field communication or Bluetooth wireless technology between the merchant device and the subset of consumer devices.

19. The merchant device of claim 12, wherein the presence data comprises promotion redemption data indicating redemption of a promotion, coupon, discount offer within the defined physical area.

20. The merchant device of claim 12, wherein the presence data comprises GPS location data corresponding to the defined physical area.

* * * * *